(12) United States Patent
Tsirtsis et al.

(10) Patent No.: US 8,935,766 B2
(45) Date of Patent: Jan. 13, 2015

(54) RECORD CREATION FOR RESOLUTION OF APPLICATION IDENTIFIER TO CONNECTIVITY IDENTIFIER

(75) Inventors: Georgios Tsirtsis, London (GB); Michaela Vanderveen, Tracy, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 13/008,954

(22) Filed: Jan. 19, 2011

(65) Prior Publication Data

US 2012/0185924 A1  Jul. 19, 2012

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *H04L 29/12* | (2006.01) |
| *H04W 12/08* | (2009.01) |

(52) U.S. Cl.
CPC .... *H04L 29/12066* (2013.01); *H04L 29/12301* (2013.01); *H04L 29/12716* (2013.01); *H04L 61/1511* (2013.01); *H04L 61/2076* (2013.01); *H04L 61/3065* (2013.01); *H04L 63/0823* (2013.01); *H04L 63/10* (2013.01); *H04W 12/08* (2013.01); *H04L 29/12688* (2013.01); *H04L 29/12783* (2013.01); *H04L 61/305* (2013.01); *H04L 61/35* (2013.01)
USPC .................. 726/6; 726/2; 726/3; 726/4; 726/5

(58) Field of Classification Search
CPC ...................... H04L 61/1511; H04L 29/12066; H04L 29/12301; H04L 61/2076; H04L 63/10
USPC ............................................................. 726/6
See application file for complete search history.

(56) References Cited

U.S. PATENT DOCUMENTS

| | | | |
|---|---|---|---|
| 6,243,749 B1 | 6/2001 | Sitaraman et al. | |
| 6,826,690 B1 * | 11/2004 | Hind et al. | 713/186 |
| 7,000,114 B1 | 2/2006 | Hasebe et al. | |
| 7,644,143 B2 * | 1/2010 | Sakou | 709/221 |
| 7,673,331 B2 | 3/2010 | Kido et al. | |
| 2004/0177141 A1 * | 9/2004 | Foody et al. | 709/224 |
| 2004/0190534 A1 * | 9/2004 | Adrangi et al. | 370/400 |
| 2005/0267968 A1 * | 12/2005 | Fearing et al. | 709/224 |

(Continued)

FOREIGN PATENT DOCUMENTS

| | | |
|---|---|---|
| EP | 1457905 A2 | 9/2004 |
| JP | 2000338867 A | 12/2000 |

(Continued)

OTHER PUBLICATIONS

B. Wellington, Secure Domain Name System (DNS) Dynamic Update, Nov. 2000, http://www.ietf.org/rfc/rfc3007.txt.*

(Continued)

*Primary Examiner* — Andrew Nalven
*Assistant Examiner* — Khang Do
(74) *Attorney, Agent, or Firm* — James K. O'Hare

(57) ABSTRACT

A method of creating a DNS record in a DNS is provided. The method includes receiving one of an allocation record or information for obtaining the allocation record from a wireless device. The allocation record includes an expression. In addition, the method includes creating a DNS record for the expression. Furthermore, the method includes associating the DNS record with a credential.

68 Claims, 6 Drawing Sheets

(56) References Cited

U.S. PATENT DOCUMENTS

| | | | |
|---|---|---|---|
| 2007/0067465 | A1 | 3/2007 | Blinn et al. |
| 2007/0149213 | A1* | 6/2007 | Lamba et al. ............. 455/456.1 |
| 2009/0144437 | A1 | 6/2009 | Fishman et al. |
| 2009/0172801 | A1* | 7/2009 | Friedrich et al. ................ 726/12 |
| 2009/0300744 | A1* | 12/2009 | Guo et al. ........................ 726/7 |
| 2010/0070760 | A1 | 3/2010 | Vanderveen et al. |
| 2010/0145963 | A1* | 6/2010 | Morris ......................... 707/758 |
| 2011/0004615 | A1* | 1/2011 | Counterman ................. 707/769 |
| 2012/0017259 | A1* | 1/2012 | MacCarthaigh .................. 726/1 |

FOREIGN PATENT DOCUMENTS

| | | | |
|---|---|---|---|
| JP | 2004072453 | A | 3/2004 |
| JP | 2004280827 | A | 10/2004 |
| JP | 2005174201 | A | 6/2005 |
| WO | WO-2009158643 | | 12/2009 |
| WO | WO-2010002603 | A1 | 1/2010 |
| WO | WO-2010075338 | A2 | 7/2010 |
| WO | 2012087762 | A1 | 6/2012 |
| WO | WO-2012094431 | A1 | 7/2012 |

OTHER PUBLICATIONS

D. Eastlake 3rd, DNS Request and Transaction Signatures (SIG(0)s ), Sep. 2000, http://www.ietf.org/rfc/rfc2931.txt.*

D. Eastlake 3rd, Secret Key Establishment for DNS (TKEY RR), Sep. 2000, http://tools.ietf.org/html/rfc2930.*

D. Cooper et al., Internet X.509 Public Key Infrastructure Certificate and Certificate Revocation List (CRL) Profile, May 2008, http://www.ietf.org/rfc/rfc5280.txt.*

Wikipedia, Fully qualified domain name, Dec. 2, 2009, http://en.wikipedia.org/wiki/Fully_qualified_domain_name.*

Kolkman, draft-iab-dns-applications-00, Oct. 17, 2010, http://tools.ietf.org/html/draft-iab-dns-applications-00.*

Gulbrandsen Troll Technologies P Vixie Internet Software Consortium L ESIB0V Microsoft Corp A: "A DNS RR for specifying the location of services (DNSSRV); rfc2782.txt", 20000201, Feb. 1, 2000, XP015008565, ISSN: 0000-0003 p. 2-p. 9.

International Search Report and Written Opinion—PCT/US2012/021456—ISA/EPO—Sep. 20, 2012.

Yasmin S., et al., "Security Issues Related with DNS Dynamic Updates for Mobile Nodes: A Survey", Frontiers of Information Technology (FIT) 2010, Dec. 21, 2010, pp. 1-6, XP55038107, Islamabad, Pakistan Retrieved from the Internet: URL:http://corenet.org.pk/data/Security Issues Related with DNS Dynamic Updates for Mobi-20110112-005730.pdf [retrieved on Sep. 13, 2012]p. 1-p. 3.

Kubota A., et al., "Name Resolution Mechanism for Secure Overlay Networking," Technical Report of the Institute of Electronics, Information and Communication Engineers, Japan, The Institute of Electronics, Information and Communication Engineers (IEICE), Mar. 19, 2010, vol. 109, No. 476, pp. 1-6.

* cited by examiner

RECORD CREATION FOR RESOLUTION OF APPLICATION IDENTIFIER TO CONNECTIVITY IDENTIFIER

BACKGROUND

1. Field

The present disclosure relates generally to communication systems, and more particularly, to record creation for resolution of application identifier to connectivity identifier.

2. Background

Application identifiers are expressions associated with applications that run on wireless devices. The expressions are broadcasted to allow other applications to discover each other. A wireless device that discovers an expression associated with an application may desire to communicate through the Internet with the wireless device on which the application is running. As such, a secure method is needed for registering a connectivity identifier associated with one or more expressions of a wireless device so that other wireless devices may communicate with the wireless device associated with the one or more expressions.

SUMMARY

In an aspect of the disclosure, a method of creating a domain name system (DNS) record in a DNS is provided. The method includes receiving one of an allocation record or information for obtaining the allocation record from a wireless device. The allocation record includes an expression. In addition, the method includes creating a DNS record for the expression. Furthermore, the method includes associating the DNS record with a credential.

In an aspect of the disclosure, an apparatus for creating a DNS record in a DNS includes means for receiving one of an allocation record or information for obtaining the allocation record from a wireless device. The allocation record includes an expression. In addition, the apparatus includes means for creating a DNS record for the expression. Furthermore, the apparatus 100 includes means for associating the DNS record with a credential.

In an aspect of the disclosure, a computer program product for creating a DNS record in a DNS includes a computer-readable medium. The computer-readable medium includes code for receiving one of an allocation record or information for obtaining the allocation record from a wireless device. The allocation record includes an expression. In addition, the computer-readable medium includes code for creating a DNS record for the expression. Furthermore, the computer-readable medium includes code for associating the DNS record with a credential.

In an aspect of the disclosure, an apparatus for creating a DNS record in a DNS includes a processing system. The processing system is configured to receive one of an allocation record or information for obtaining the allocation record from a wireless device. The allocation record includes an expression. In addition, the processing system is configured to create a DNS record for the expression. Furthermore, the processing system is configured to associate the DNS record with a credential.

DETAILED DESCRIPTION

Figure 1:
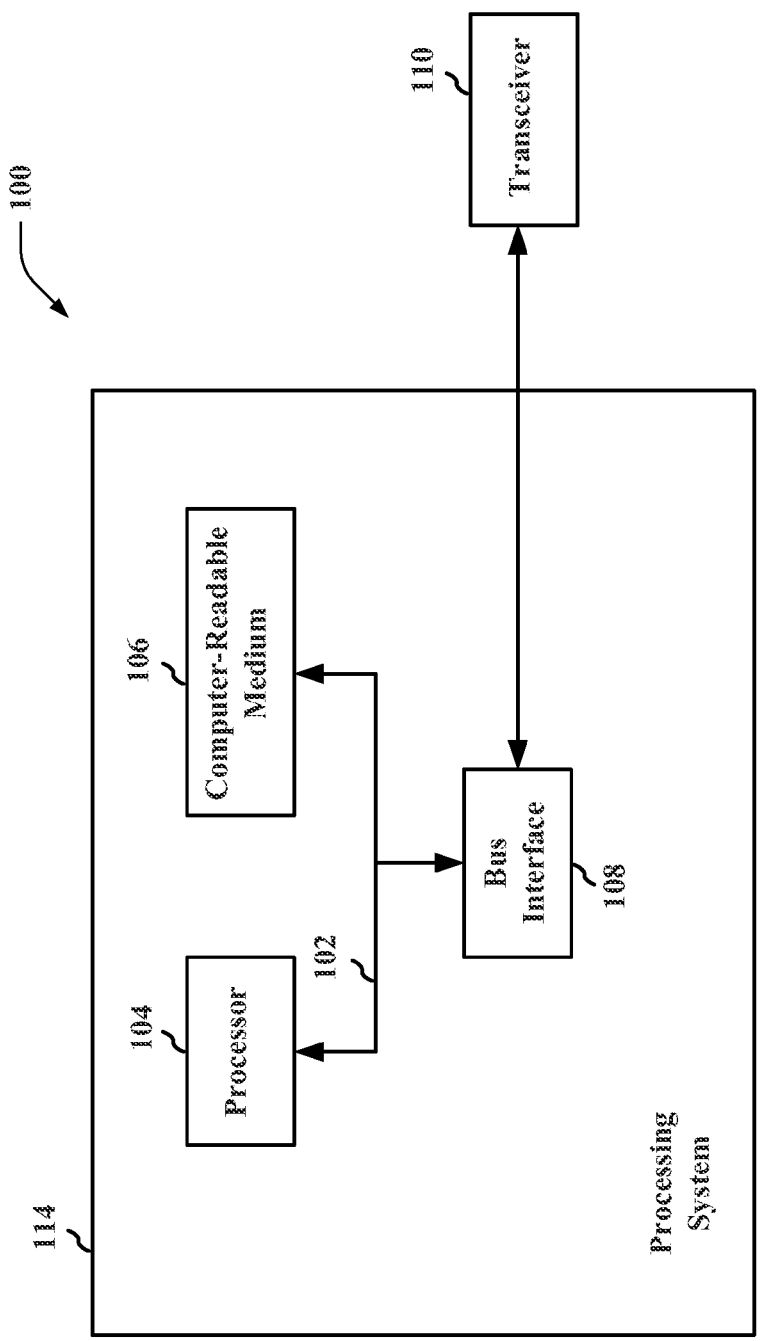
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
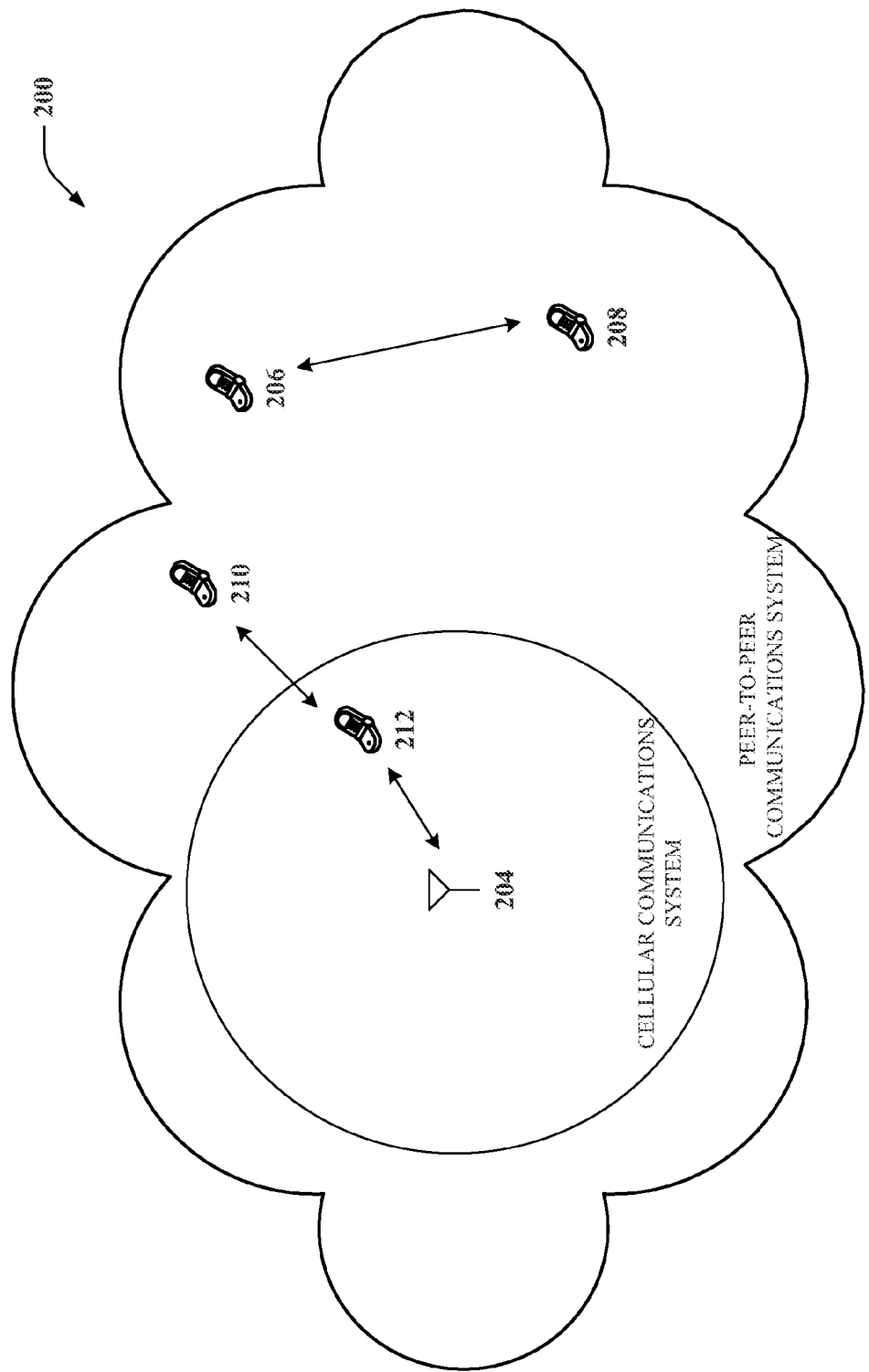
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
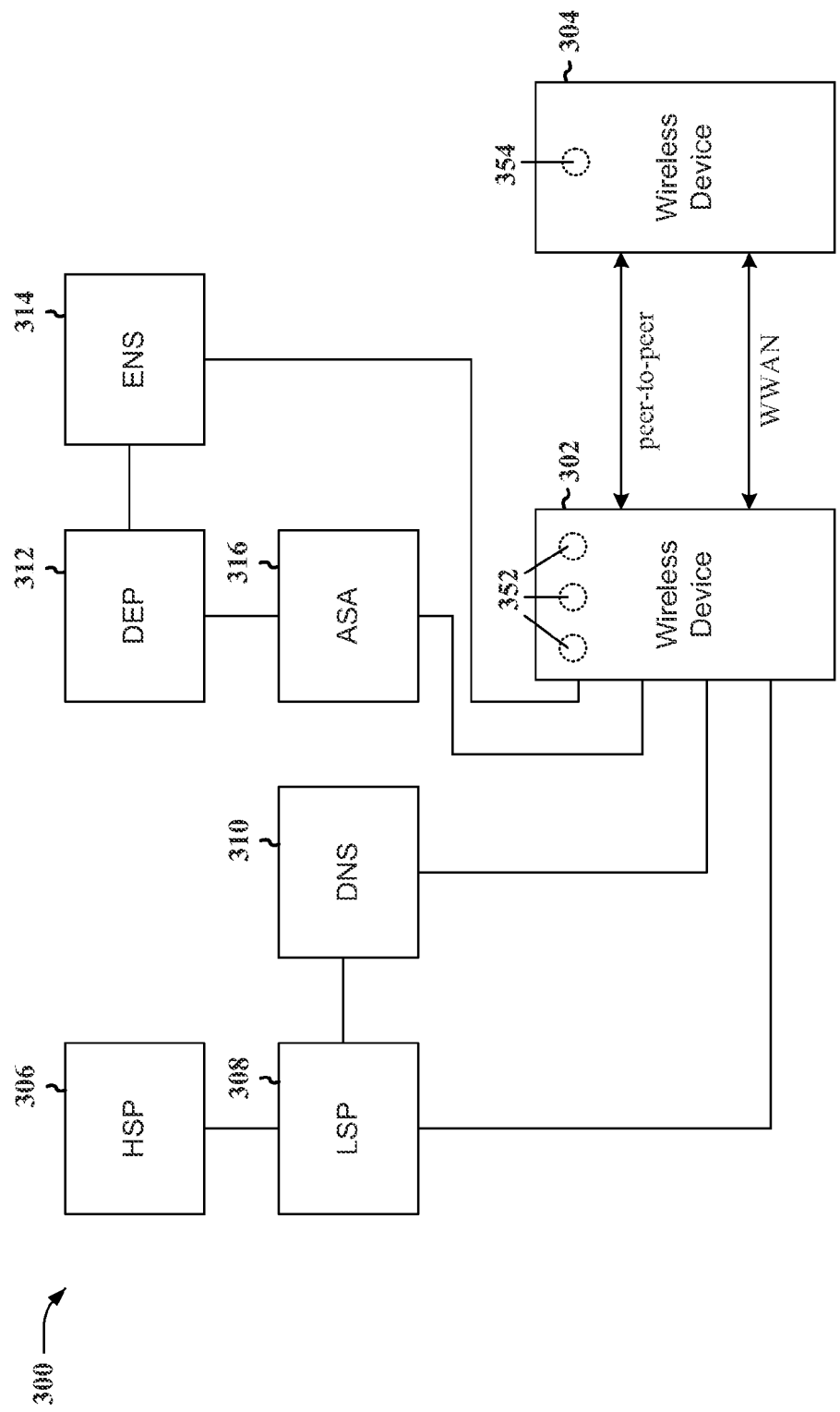
FIG. 3 is a diagram illustrating a system architecture for wireless peer-to-peer communications system.

FIG. 3 is a diagram illustrating a system architecture 300 for a wireless peer-to-peer communications system. As shown in FIG. 3, the wireless device 302 may communicate with the wireless device 304 directly through peer-to-peer communication or indirectly through a base station using WWAN communication. On each of the wireless devices 302, 304, applications may be active. For example, a plurality of applications 352 are running on the wireless device 302 and an application 354 is running on the wireless device 304. Each of the applications may be associated with a unique application identifier. An application identifier is an expression. An expression is referred to as "direct" if there is no privacy restriction on its discoverability. Direct expressions are strings that are broadcasted to allow applications to discover each other so that they may communicate together through peer-to-peer and/or WWAN communication. As such, direct expressions may be any application-defined information string, such a location, a service, or otherwise an identifier associated with a particular application running on a wireless device. Each direct expression may have a shorter form code representation. The code representation is referred to as a direct expression code.

The wireless device 302 receives an allocation of individual direct expressions from the Allocation Server (AS) 316. The AS may also be referred to as an Application Specific Allocator (ASA). There may be multiple ASs 316, all of which coordinate together to allocate unique direct expressions. The AS 316 is coupled to the Direct Expression Provider (DEP) 312. The DEP 312 manages direct expression name and code spaces and allocates blocks of direct expression codes to the AS 316. The wireless device 302 and the DEP 312 may obtain a mapping between any direct expression name and direct expression code from the Expression Name System (ENS) 314, which maintains a repository of mappings between direct expression names and codes.

The Home Service Provider (HSP) 306 authenticates and authorizes the wireless device 302 to use the subscription service. The Local Spectrum Provider (LSP) 308 enables the wireless device 302 to access the radio spectrum in a given area by providing the wireless device 302 authorizing information. The LSP 308 is coupled to the Domain Name Server (DNS) 310, which maintains DNS records so that wireless devices may look up an Internet Protocol (IP) address associated with a direct expression.

Figure 4:
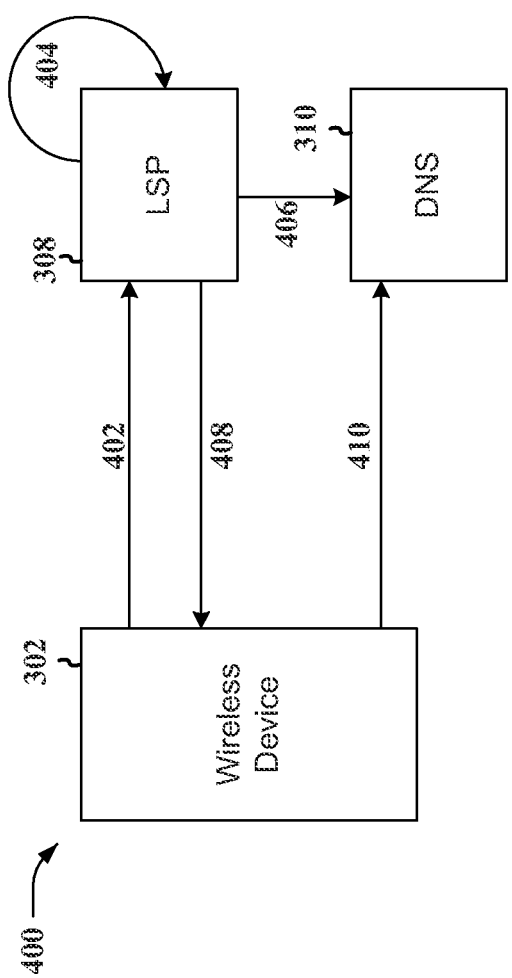
FIG. 4 is a diagram for illustrating an exemplary method.

FIG. 4 is a diagram 400 for illustrating an exemplary method. The wireless device 302 receives an allocation record from the AS 316. The allocation record is a record of the direct expression allocation from the DEP 312. The allocation record may include the following information:
    Direct Expression Name
    Direct Expression Code
    Direct Expression Lifetime
    Device Identifier
    DEP Record
        Direct Expression Code Block
        AS Identifier
        AS Public Key
        Block Lifetime
        DEP Public Key
        DEP Signature
    AS Public Key
    AS Signature The direct expression name is a string of the direct expression. The direct expression code is the coded form of the direct expression name. The direct expression lifetime is the lifetime in which the direct expression name is valid. The device identifier is a unique identifier associated with the wireless device, such as for example, the media access control (MAC) address of the wireless device, or the unique certificate identifier of a certificated embedded in, or otherwise associated with, the device. The application identity is an identity associated with the application which intends to use the direct expression and may optionally be included in the allocation record. The DEP record is the record that the AS 316 received from the DEP 312. The DEP record includes the direct expression code block allocated to the AS 316, an identifier identifying the AS that received the DEP record, a public key of the AS 316, the lifetime in which the direct expression code block may be validly allocated, a public key of the DEP 312, and a signature of the DEP 312. Each public key, such as the AS public key and the DEP public key, may be a link or pointer to the respective published public key.

The wireless device 302 sends (402) the allocation record to the LSP 308 or sends an identifier, for example a device ID, via which the allocation record can be retrieved, for example be queering the ENS 314. The wireless device 302 may also send (402) a device credential, a public key, and/or an IP address of the wireless device 302 with the allocation record to the LSP 308. The device credential may be an X.509 v3 digital certificate and may include a device identifier (e.g., MAC identifier) of the wireless device 302 and a public key generated by the wireless device 302 based on a private key of the wireless device 302. The LSP 308 verifies (404) the allocation record using the device credential. Specifically, the LSP 308 verifies (404) the DEP record, the ASA signature, that the direct expression lifetime is current, and that the device identifier belongs to the wireless device 302. After verification, the LSP generates (404) a credential (authorization ticket), which is a digital certificate (e.g., X.503 v3 digital certificate). The LSP 308 embeds the direct expression and the public key received (402) separately from the device credential into the generated credential. The LSP 308 creates (406) a DNS record for the direct expression in the DNS 310. The DNS record is associated with the generated credential and may include information related to the generated credential such as a subject name, a serial number, and/or a public key. Alternatively, the DNS record may be associated with a different credential generated by the LSP 308. The DNS record is also associated with an IP address of the wireless device 302 or a placeholder for an IP address if not known. The DNS record may be associated with a particular IP address at the time of creation by the LSP 308 (406) or later by the wireless device 302 (410). The DNS record may also include a fully qualified domain name (FQDN). The FQDN may be generated by appending a domain name of the LSP to the direct expression. For example, if the direct expression is "dexp" and the domain name of the LSP is "lsp.net," then the FQDN would be "dexp.lsp.net." Alternatively, a hex representation of the binary value of the direct expression code is used in combination with the domain name of the LSP. After creating the DNS record for the direct expression and associating the DNS record with the generated credential, i.e., either the authorization ticket or another credential, the LSP 308 sends (408) the generated credential (both of them if both an authorization ticket and another credential have been generated) to the wireless device 302 so that the wireless device 302 may securely update (410) the DNS record of the direct expression. As such, the generated credential is a shared key known by both the wireless device 302 and the DNS 310.

Figure 5:
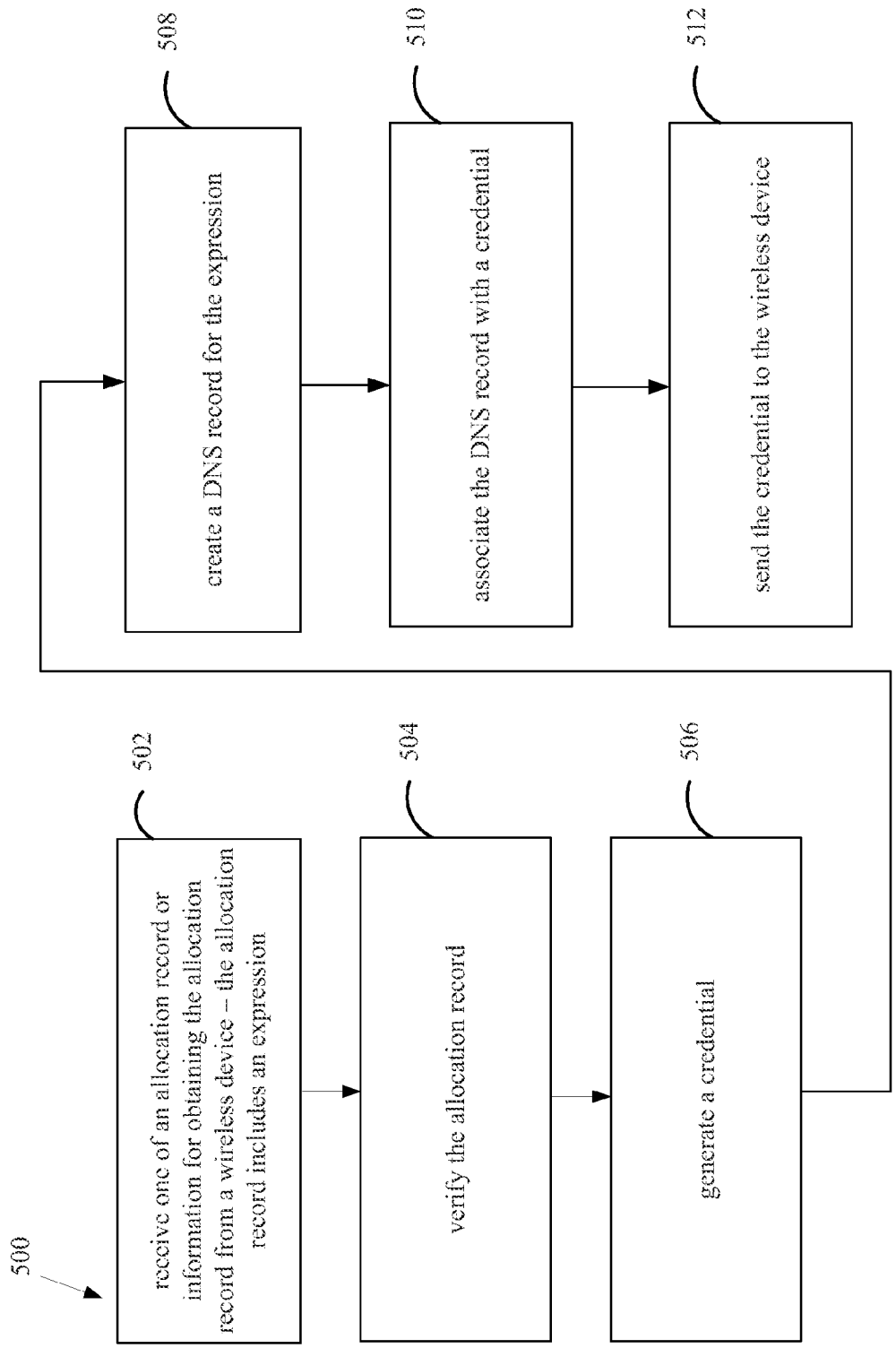
FIG. 5 is a flow chart of a method of wireless communication.

FIG. 5 is a flow chart 500 of an exemplary method. The method is performed by an LSP 308 when creating a DNS record in a DNS 310. As shown in FIG. 5, the LSP 308 receives one of an allocation record or information for obtaining the allocation record from a wireless device (502). The allocation record includes an expression (502). The expression may be unique. When the LSP 308 receives information for obtaining the allocation record, the information is an identifier (e.g., a device ID) through which the allocation record can be retrieved. The LSP 308 verifies the allocation record (504). The LSP 308 may verify the allocation record with a device credential received from the wireless device. Upon verifying the allocation record, the LSP generates a credential (506). Next, the LSP 308 creates a DNS record for the expression (508) and associates the DNS record with the credential (510). The LSP 308 then sends the credential to the wireless device (512). The credential is a shared key known by the wireless device and the DNS 310. As such, with the received credential, the wireless device may access and securely update the DNS record of the expression.

The LSP 308 may receive a public key from the wireless device and embed the public key in the generated credential. The LSP 308 may receive a current IP address from the wireless device. In such a configuration, the DNS record is created with the current IP address. Alternatively, the wireless device may use the credential received from the LSP to update the DNS record with the current IP address of the wireless device. The generated credential may be a digital certificate, such as for example, an X.509 v3 digital certificate. In such a configuration, the expression is embedded in the digital certificate. The DNS record may be created to include an FQDN generated by appending a domain name of the LSP to the expression. Furthermore, the DNS may be created to include information related to the credential.

Figure 6:
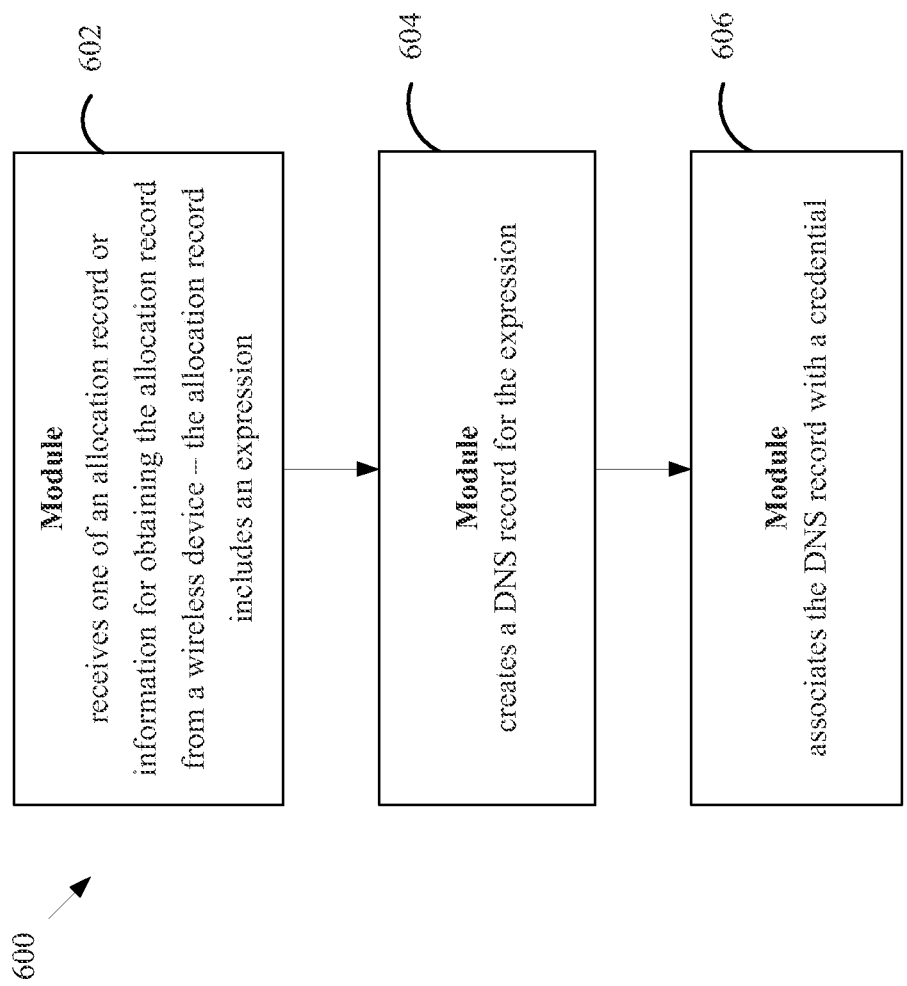
FIG. 6 is a conceptual block diagram illustrating the functionality of an exemplary apparatus.

FIG. 6 is a conceptual block diagram 600 illustrating the functionality of an exemplary apparatus 100, which may be an LSP 308. The apparatus 100 includes a module 602 that receives one of an allocation record or information for obtaining the allocation record from a wireless device. The allocation record includes an expression. In addition, the apparatus 100 includes a module 604 that creates a DNS record for the expression. Furthermore, the apparatus 100 includes a module 606 that associates the DNS record with a credential.

Referring to FIG. 1, in one configuration, the apparatus 100 for creating a DNS record in a DNS includes means for receiving an allocation record from a wireless device. The allocation record includes an expression. The apparatus 100 further includes means for creating a DNS record for the expression and means for associating the DNS record with a credential. The apparatus 100 may further include means for receiving a device credential from the wireless device, and means for verifying the allocation record with the device credential. The apparatus 100 may further include means for generating a credential, and means for sending the credential to the wireless device. The apparatus 100 may further include means for receiving a public key from the wireless device, and means for embedding the public key in the credential. The apparatus 100 may further include means for verifying the allocation record. The apparatus 100 may further include means for receiving a current IP address from the wireless device. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of creating a domain name system (DNS) record in a DNS, comprising:
   enabling a wireless device to access a cellular spectrum in a preselected area;
   receiving one of an allocation record or information for obtaining the allocation record from the wireless device on the cellular spectrum, the allocation record including an expression comprising an application identifier for an application stored on the wireless device;
   creating a DNS record for the expression; and
   associating the DNS record with a credential.

2. The method of claim 1, further comprising:
   receiving a device credential from the wireless device; and
   verifying the allocation record with the device credential.

3. The method of claim 1, further comprising:
   generating a credential; and
   sending the credential to the wireless device.

4. The method of claim 1, further comprising:
   receiving a public key from the wireless device; and
   embedding the public key in the credential.

5. The method of claim 1, further comprising verifying the allocation record.

6. The method of claim 1, wherein the expression is unique.

7. The method of claim 1, wherein the credential allows the wireless device to securely update the DNS record of the expression.

8. The method of claim 1, further comprising receiving a current Internet Protocol (IP) address from the wireless device, wherein the DNS record is created with the current IP address.

9. The method of claim 1, wherein the credential is a digital certificate.

10. The method of claim 9, wherein the expression is embedded in the digital certificate.

11. The method of claim 1, wherein the credential is a shared key known by the wireless device and the DNS.

12. The method of claim 1, wherein the method is performed by a Local Spectrum Provider (LSP) and the DNS record is created to include a fully qualified domain name (FQDN) generated by appending a domain name of the LSP to the expression.

13. The method of claim 1, wherein the DNS record is created to include information related to the credential.

14. The method of claim 1, further comprising broadcasting the expression to enable application discovery.

15. The method of claim 1, wherein the expression is used to discover the wireless device over the cellular spectrum.

16. The method of claim 1, wherein the method is performed by a single entity.

17. The method of claim 16, wherein the expression is configured to be broadcasted to enable application discovery over the cellular spectrum.

18. An apparatus for creating a domain name system (DNS) record in a DNS, comprising:
   means for enabling a wireless device to access a cellular spectrum in a preselected area;
   means for receiving one of an allocation record or information for obtaining the allocation record from the wireless device on the cellular spectrum, the allocation record including an expression comprising an application identifier for an application stored on the wireless device;
   means for creating a DNS record for the expression; and
   means for associating the DNS record with a credential.

19. The apparatus of claim 18, further comprising:
   means for receiving a device credential from the wireless device; and
   means for verifying the allocation record with the device credential.

20. The apparatus of claim 18, further comprising:
   means for generating a credential; and
   means for sending the credential to the wireless device.

21. The apparatus of claim 18, further comprising:
   means for receiving a public key from the wireless device; and
   means for embedding the public key in the credential.

22. The apparatus of claim 18, further comprising means for verifying the allocation record.

23. The apparatus of claim 18, wherein the expression is unique.

24. The apparatus of claim 18, wherein the credential allows the wireless device to securely update the DNS record of the expression.

25. The apparatus of claim 18, further comprising means for receiving a current Internet Protocol (IP) address from the wireless device, wherein the DNS record is created with the current IP address.

26. The apparatus of claim 18, wherein the credential is a digital certificate.

27. The apparatus of claim 26, wherein the expression is embedded in the digital certificate.

28. The apparatus of claim 18, wherein the credential is a shared key known by the wireless device and the DNS.

29. The apparatus of claim 18, wherein the apparatus is a Local Spectrum Provider (LSP) and the DNS record is created to include a fully qualified domain name (FQDN) generated by appending a domain name of the LSP to the expression.

30. The apparatus of claim 18, wherein the DNS record is created to include information related to the credential.

31. The apparatus of claim 18, further comprising means for broadcasting the expression to enable application discovery.

32. The apparatus of claim 18, wherein the expression is used to discover the wireless device over the cellular spectrum.

33. The apparatus of claim 18, wherein the apparatus is a single entity.

34. The apparatus of claim 33, wherein the expression is configured to be broadcasted to enable application discovery over the cellular spectrum.

35. A non-transitory computer program product for creating a domain name system (DNS) record in a DNS, comprising:
    a computer-readable medium comprising code for:
        enabling a wireless device to access a cellular spectrum in a preselected area;
        receiving one of an allocation record or information for obtaining the allocation record from the wireless device on the cellular spectrum, the allocation record including an expression comprising an application identifier for an application stored on the wireless device;
        creating a DNS record for the expression; and
        associating the DNS record with a credential.

36. The apparatus of claim 35, wherein the computer-readable medium further comprises code for:
    receiving a device credential from the wireless device; and
    verifying the allocation record with the device credential.

37. The apparatus of claim 35, wherein the computer-readable medium further comprises code for:
    generating a credential; and
    sending the credential to the wireless device.

38. The apparatus of claim 35, wherein the computer-readable medium further comprises code for:
    receiving a public key from the wireless device; and
    embedding the public key in the credential.

39. The apparatus of claim 35, wherein the computer-readable medium further comprises code for verifying the allocation record.

40. The apparatus of claim 35, wherein the expression is unique.

41. The apparatus of claim 35, wherein the credential allows the wireless device to securely update the DNS record of the expression.

42. The apparatus of claim 35, wherein the computer-readable medium further comprises code for receiving a current Internet Protocol (IP) address from the wireless device, wherein the DNS record is created with the current IP address.

43. The apparatus of claim 35, wherein the credential is a digital certificate.

44. The apparatus of claim 43, wherein the expression is embedded in the digital certificate.

45. The apparatus of claim 35, wherein the credential is a shared key known by the wireless device and the DNS.

46. The apparatus of claim 35, wherein the apparatus is a Local Spectrum Provider (LSP) and the DNS record is created to include a fully qualified domain name (FQDN) generated by appending a domain name of the LSP to the expression.

47. The apparatus of claim 35, wherein the DNS record is created to include information related to the credential.

48. The apparatus of claim 35, wherein the computer-readable medium further comprises code for broadcasting the expression to enable application discovery.

49. The apparatus of claim 35, wherein the expression is used to discover the wireless device over the cellular spectrum.

50. The apparatus of claim 35, wherein the apparatus is a single entity.

51. The apparatus of claim 50, wherein the expression is configured to be broadcasted to enable application discovery over the cellular spectrum.

52. An apparatus for creating a domain name system (DNS) record in a DNS, comprising:
    a processing system configured to:
        enable a wireless device to access a cellular spectrum in a preselected area;
        receive one of an allocation record or information for obtaining the allocation record from the wireless device on the cellular spectrum, the allocation record including an expression comprising an application identifier for an application stored on the wireless device;
        create a DNS record for the expression; and
        associate the DNS record with a credential.

53. The apparatus of claim 52, wherein the processing system is further configured to:
    receive a device credential from the wireless device; and
    verify the allocation record with the device credential.

54. The apparatus of claim 52, wherein the processing system is further configured to:
    generate a credential; and
    send the credential to the wireless device.

55. The apparatus of claim 52, wherein the processing system is further configured to:
    receive a public key from the wireless device; and
    embed the public key in the credential.

56. The apparatus of claim 52, wherein the processing system is further configured to verify the allocation record.

57. The apparatus of claim 52, wherein the expression is unique.

58. The apparatus of claim 52, wherein the credential allows the wireless device to securely update the DNS record of the expression.

59. The apparatus of claim 52, wherein the processing system is further configured to receive a current Internet Protocol (IP) address from the wireless device, wherein the DNS record is created with the current IP address.

60. The apparatus of claim 52, wherein the credential is a digital certificate.

61. The apparatus of claim 60, wherein the expression is embedded in the digital certificate.

62. The apparatus of claim 52, wherein the credential is a shared key known by the wireless device and the DNS.

63. The apparatus of claim 52, wherein the apparatus is a Local Spectrum Provider (LSP) and the DNS record is created to include a fully qualified domain name (FQDN) generated by appending a domain name of the LSP to the expression.

64. The apparatus of claim 52, wherein the DNS record is created to include information related to the credential.

65. The apparatus of claim 52, wherein the processing system is further configured to broadcast the expression to enable application discovery.

66. The apparatus of claim 52, wherein the expression is used to discover the wireless device over the cellular spectrum.

67. The apparatus of claim 52, wherein the apparatus is a single entity.

68. The apparatus of claim 67, wherein the expression is configured to be broadcasted to enable application discovery over the cellular spectrum.

\* \* \* \* \*